Herbert H. Vickers Inventor

Herbert H. Vickers Inventor

Patented Oct. 4, 1949

2,483,511

UNITED STATES PATENT OFFICE 2,483,511

INNER TUBE SPLICING DEVICE

Herbert H. Vickers, Union, N. J., assignor to Standard Oil Development Company, a corporation of Delaware Application June 2, 1947, Serial No. 751,803

4 Claims. (Cl. 154—9.7)

This invention relates to improvements in apparatus for the splicing of rubber articles.

Methods and machines for the automatic splicing of inner tubes and the like are disclosed in U. S. Patents 2,024,577; 2,024,578; 2,040,466; 2,272,881; 2,273,463 and 2,273,464. In practicing the inventions of the above enumerated patents, two ends of the inner tube stock are clamped flat in a pair of aligned clamping devices, and while so held, said ends are cut off transversely and heated. Thereafter the freshly cut ends are brought forcibly together and joined preparatory to vulcanization.

The above mentioned methods and machines are, in general, highly satisfactory for making inner tubes of natural rubber since natural rubber inner tube compositions are extremely pliable, have a very high degree of tack, are easy to flatten completely in the clamps and have an enveloping quality that enables them to form a satisfactory bond between two surfaces even though separated by a coating of talc.

Butyl rubber, or the copolymers of an isoolefin such as isobutylene and a multi-olefin such as butadiene or isoprene prepared at low temperatures in the presence of Friedel-Crafts catalysts as described in U. S. Patent 2,356,128 dated August 22, 1944 by Thomas and Sparks, have been found to be vastly superior to natural rubber as a gas barrier and therefore superior as inner tube stock material since tires having inner tubes made thereof require inflation much less frequently. It has been found, however, that it is extremely difficult to manufacture inner tubes of Butyl rubber by the above mentioned methods and machines without forming a considerable number of defective tubes or rejects. Properties contributing to this difficulty are (1) the difficulty of cutting the tube stock to a perpendicular and true face, (2) the resistivity of unevenly cut faces to flattening or matching on pressure contact in the butting of the tube ends, (3) the resistivity to flattening of the folded tube causing the formation of a hollow core within the flattened tube folds, and (4) the tendency to crack at the tube folds.

It is the object of the present invention to provide means for cutting inner tube stock in such a manner as to lead to substantial improvement in the splice obtained.

It is also the object of this invention to provide means for compacting the inner tube stock at the folded portions thereof during the cutting thereof.

These and other objects will appear more clearly from the detailed specification and claims which follow:

I have found that the efficacy of inner tube splicing machines such as are disclosed in the above identified patents can be substantially improved if holding and compacting members are provided for holding down and grasping the free ends of the tube stock in such a manner as to create a squeezing or compacting action particularly at or near the tube folds in order to offset the squeezing action and the consequent displacement of the tube stock that occurs under the knife and the clamps during the normal cutting operation. In this way the tube ends are trimmed to substantially true vertical faces and a slightly greater amount of stock is provided at the folds thereby increasing the pressure at the folds when the trimmed tube ends are brought into abutment during splicing. This small increase in the amount of stock produces a very substantial increase in the strength of the splice obtainable particularly at the folds.

Reference is made to the accompanying drawings illustrating the present invention. In the drawings, Figure 1 is a side view, partly in section showing the clamps and a tube trimmer provided with a compacting spring in accordance with the present invention.

Figure 1:
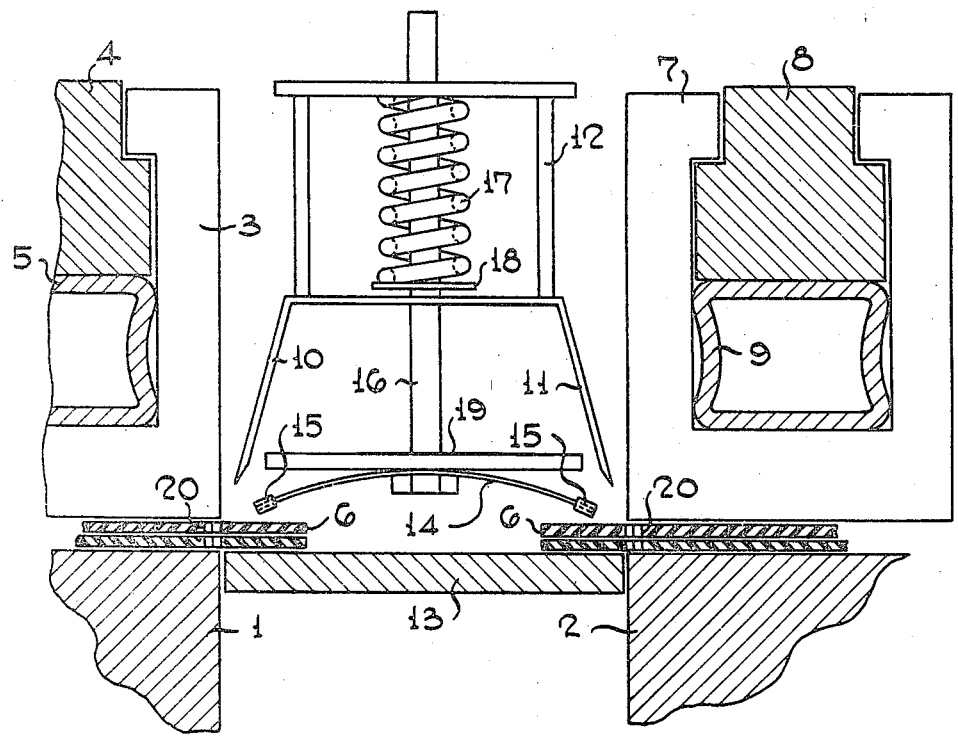

Referring to the drawings, 1 and 2 are the bases or supporting dies for the clamps. 3 is a movable article engaging member or lamina, a plurality of which are mounted on a supporting arm 4 for engagement with the tube stock, 5 is a pneumatic bag which opposes movement of the laminae 3 and maintains the several laminae in contact with the tube stock under a pressure which is directly dependent upon the fluid pressure within the bag. 7 is a lamina while 8 and 9 are the supporting arm and pneumatic bag respectively of the opposing clamp for securing the other end of the tube stock 6. It will be understood that the clamps, supporting dies, cutters, etc. are mounted in a machine such as is shown for example in the Campbell et al. U. S. Patent No. 2,273,463, or in Stevens U. S. Patent 2,272,881. Since the means for closing the clamps, maintaining them under the necessary pressure for satisfactory clamping, for moving the cutting knives into and out of cutting position and for moving the clamps together to form the splice form no part of the present invention illustration thereof is deemed unnecessary. The laminae 3 and 7 may be provided, if desired, with projecting teeth at their front edges for exerting a compacting action on the folded tube stock in order to reduce the size of the hollow core at the fold.

Figure 4:
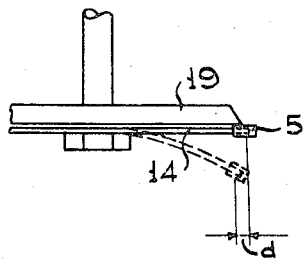
Figure 4 is a detail view showing the outward movement of the compacting spring.

Cutting and trimming knives 10 and 11 which are heated by suitable electrical heating elements are mounted in a carriage or frame 12 for movement substantially vertically through the tube stock for cutting the tube stock to size and for providing the desired fresh cut face for splicing. 13 is a cutting anvil for supporting the free ends of the tube stock during the cutting operation. A compacting spring 14 provided with tube engaging plates 15 is mounted on the frame 12 by means of the rod 16, spring 17 and collar 18. A backing or pressure plate 19 is provided for limiting the movement of the compacting spring 14. As the carriage 12 and knives 10 and 11 are brought into cutting position, the plates 15 on the compacting spring 14 first contact the tube stock at the folds. Further vertical movement of the carriage causes progressive flattening of the compacting spring 14 against the pressure plate 19 and gradual compression of the coil spring 17 between the collar 18 and the top of the frame 12. The lateral movement of the plates 15 as the trimming knives are brought down to the tube stock is shown in Figure 4, the position of the plate 15 when the same first contacts the tube stock being shown in dotted lines while the final position of the plate at the time of cutting is shown in full lines. The amount of lateral movement d of the plates 15 determines the amount of endwise compression of the tube stock and may be varied by varying the curvature of the spring 14. The compacting spring 14 and plates 15 only contact the tube stock at the folds and are seldom more than an inch in width.

Figure 2:
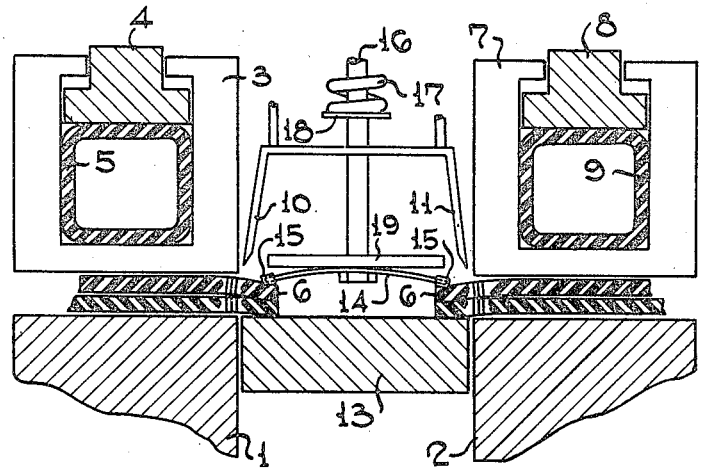
Figure 2 is a similar view showing the compacting spring partly compressed.
Figure 3:
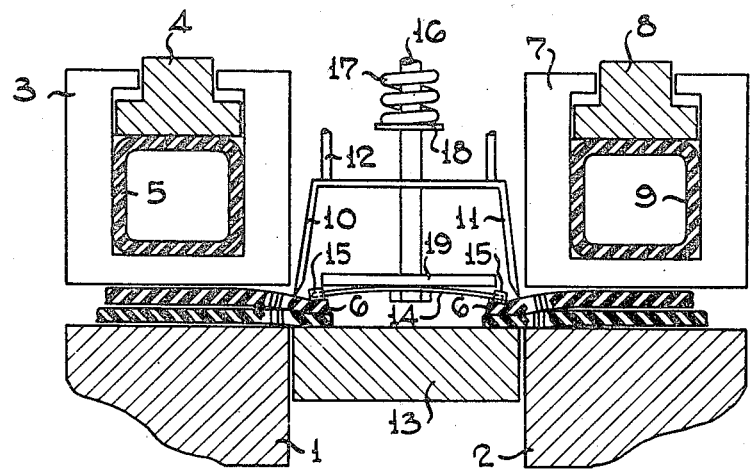
Figure 3 is a similar view showing the compacting spring substantially at its limit of movement with the trimming knife starting its cut through the tube stock.

Equally spaced grid lines 20 are shown on the tube stock to show the displacement of the tube stock by the compressive action of the compacting spring 14. It may readily be seen by comparing the position of the grid lines in Figures 1, 2 and 3 that the compressive action of the compacting spring 14 and plates 15 compresses the tube stock at the folds and that therefore, when the knife cuts the tube stock a slight excess of stock will be left at the folds so that the freshly cut tube stock will be slightly curved at the folds, and that this slightly greater amount of rubber at the folds will result in an increase in pressure at these areas when the tube ends are brought into abutment to form the splice, resulting in a stronger splice.

While the pressure effects in the embodiment described are obtained by springs it is obvious that the same effects could be obtained with hydraulic or pneumatic means, or electrically with a solenoid.

The foregoing description contains a limited number of embodiments. It will be understood that numerous variations are possible without departing from the scope of the following claims.

What I claim and desire to secure by Letters Patent is:

1. In a device of the character described, a base for supporting material to be spliced, clamps for holding the material to be spliced on said base during the trimming and splicing of said material, means for trimming the free ends of the material to be spliced and means associated with said trimming means for compressing the free ends of the material near its lateral edges to offset the compressive action of said clamps and trimming means.

2. A device for splicing inner tubes, comprising bases for supporting the ends of the inner tube stock, clamps for holding the inner tube stock on said bases during the trimming and splicing of said stock, knives for trimming the ends of the tube stock, a frame for supporting said knives and for moving the same into cutting engagement with the tube stock, compacting springs supported on said carriage for contact with the folds of the tube stock, means for forcing said compacting springs into engagement with the tube stock in such a way as to exert a compressing action on the fold of the tube stock to offset the displacement of the stock caused by said clamps and knives.

3. A device for splicing inner tubes comprising bases for supporting the ends of the inner tube stock, clamps for holding the inner tube stock on said bases during the trimming and splicing of said stock, knives for trimming the ends of the tube stock, a frame for supporting said knives and for moving the same into cutting engagement with the tube stock, arcuate compacting spring bars supported on said carriage for contact with the folds of the tube stock, means for compressing said spring bars as the knives are brought into cutting engagement with the tube stock whereby said spring bars exert a compressing action on the tube folds toward the clamps in order to offset the displacement of the stock caused by said clamps and knives.

4. In a device of the character described, base members for supporting materials to be spliced, clamps for holding said materials on said base with the opposed free ends extending beyond said clamps and base members, a cutting anvil between said base members to support the free ends of said material, means for trimming the free ends of said material, and means associated with said trimming means movable therewith to engage the free ends of said material, near the lateral edges thereof, prior to contact of the trimming means with said material, to compress said ends at the lateral edges against the anvil and toward the clamping means, during trimming of said ends by the trimming means.

HERBERT H. VICKERS.

REFERENCES CITED

The following references are of record in the file of this patent:

UNITED STATES PATENTS

| Number | Name | Date |
| --- | --- | --- |
| 1,305,666 | Palmer et al. | June 3, 1919 |
| 2,024,578 | Haase | Dec. 17, 1935 |
| 2,065,033 | Stevens | Dec. 22, 1936 |
| 2,254,596 | Breth et al. | Sept. 2, 1941 |
| 2,272,881 | Stevens | Feb. 10, 1942 |
| 2,273,463 | Campbell et al. | Feb. 17, 1942 |